United States Patent
Rapoport (10) Patent No.: US 8,866,358 B2
(45) Date of Patent: Oct. 21, 2014

(54) EFFICIENT AND POWERFUL ELECTRIC MOTOR INTEGRATED WITH A GENERATOR

(76) Inventor: Uri Rapoport, Moshav Ben Shemen (IL)

( * ) Notice: Subject to any disclaimer, the term of this patent is extended or adjusted under 35 U.S.C. 154(b) by 253 days.

(21) Appl. No.: 13/495,679

(22) Filed: Jun. 13, 2012

(65) Prior Publication Data

US 2012/0319517 A1 Dec. 20, 2012

Related U.S. Application Data (60) Provisional application No. 61/497,523, filed on Jun. 16, 2011.

(51) Int. Cl.
| | | |
|---|---|---|
| *H02K 47/00* | (2006.01) | |
| *H02K 21/24* | (2006.01) | |
| *H02K 47/14* | (2006.01) | |
| *H02K 21/02* | (2006.01) | |
| *H02K 47/20* | (2006.01) | |
| *H02K 47/04* | (2006.01) | |
| *H02K 1/27* | (2006.01) | |

(52) U.S. Cl.
CPC ............... *H02K 21/24* (2013.01); *H02K 47/00* (2013.01); *H02K 47/14* (2013.01); *H02K 21/026* (2013.01); *H02K 47/20* (2013.01); *H02K 47/04* (2013.01); *H02K 1/2793* (2013.01)
USPC ........ 310/113; 310/102 R; 310/114; 310/208; 310/268

(58) Field of Classification Search
CPC ... H02K 1/2793; H02K 21/026; H02K 21/24; H02K 47/00; H02K 47/04; H02K 47/14; H02K 47/20

USPC .............................. 310/102 R, 114, 208, 268
IPC .............................................. H02K 21/24,47/00
See application file for complete search history.

(56) References Cited

U.S. PATENT DOCUMENTS

| | | | | |
|---|---|---|---|---|
| 3,832,581 | A | * | 8/1974 | Hoffmann et al. .............. 310/46 |
| 4,684,814 | A | | 8/1987 | Radomski |
| 5,731,649 | A | | 3/1998 | Caamano |
| 5,903,082 | A | * | 5/1999 | Caamano ............... 310/216.001 |
| 6,849,984 | B2 | * | 2/2005 | Gallant ......................... 310/178 |
| 7,134,180 | B2 | * | 11/2006 | Hsu .................................. 29/596 |
| 7,791,246 | B2 | * | 9/2010 | Okazaki et al. ............... 310/268 |
| 7,808,142 | B2 | * | 10/2010 | Wise ......................... 310/156.32 |
| 2007/0046124 | A1 | * | 3/2007 | Aydin et al. .............. 310/156.37 |
| 2008/0024035 | A1 | * | 1/2008 | Aydin et al. ................... 310/268 |
| 2008/0179982 | A1 | * | 7/2008 | Kramer ......................... 310/168 |
| 2011/0109185 | A1 | * | 5/2011 | Sullivan et al. .......... 310/156.35 |
| 2011/0115327 | A1 | * | 5/2011 | Pan .......................... 310/156.36 |
| 2012/0242181 | A1 | * | 9/2012 | Gruendl et al. ............... 310/152 |
| 2012/0319517 | A1 | * | 12/2012 | Rapoport ..................... 310/113 |

FOREIGN PATENT DOCUMENTS

WO    2006/108146    12/2006

* cited by examiner

*Primary Examiner* — John K Kim
(74) *Attorney, Agent, or Firm* — The Law Office of Michael E. Kondoudis (57) ABSTRACT

An incorporated electric motor-generator (IEMG), including: a plurality of disk surfaces each having a main longitudinal axis, at least one peripheral motor section and at least one central generator section; a plurality of stationary support structures, each of which sustains an array of electromagnetic coils; and a rotating shaft affixed to the disk surfaces.

20 Claims, 6 Drawing Sheets

EFFICIENT AND POWERFUL ELECTRIC MOTOR INTEGRATED WITH A GENERATOR

FIELD OF THE INVENTION

The present invention generally relates to a combined electric motor and generator configuration, which returns electrical energy usable for driving the motor.

The present invention particularly relates to an efficient and powerful motor containing a generator section by utilizing a substantially similar configuration for the generator section.

BACKGROUND OF THE INVENTION

Reactive devices of electrical circuits, i.e. inductance and capacitance, are known to store energy. A regenerative motor that produces electrical energy, which is fed back to the motor, is a mechanical equivalent reactive device storing energy mechanically.

Motors, which are energy conversion devices, can convert in either direction. When a motor is combined with a generator, the electrical voltage output of the generator is sourced by the power amplifier and reduces the amount of electric power needed to drive the motor. Instead of inputting electrical energy, it proceeds to source it instead, drawing from its mechanical supply. The measurable result is a winding-induced efficient regeneration is a capability for a new age in motor-drive design.

As environmental protection considerations are becoming an imperative concern on the world agenda, the benefit of regenerative motor control is becoming increasingly evident and a driving force for development of this breed of motors.

U.S. Pat. No. 4,684,814 enclosed herein by reference, discloses a compact, high efficiency non-interruptive motor generator power system for generating and supplying to a load A.C. of a substantially constant frequency and of a substantially constant voltage, the motor thereof being a synchronous A.C. motor energizable from a source of irregular and interruptible A.C. line power, the generator being capable of converting its rotational energy into the A.C. output for many seconds after interruption of the A.C. line power. The power system comprises a high efficiency, synchronous permanent magnet A.C. motor and an A.C. generator coupled to and driven by the motor. Both the motor and generator have a high rotational inertia common rotor wherein an outer cylindrical shell contains motor and generator rotor elements of high permeability soft magnetic material with a surface layer of magnetizable permanent magnetic material, and in each stator is an excitation coil, energizable with A.C., having a pole piece adjacent a layer of permanent magnetic material whereby to magnetize the layer into a selected pattern of north and south magnetic poles. The motor stator is within and encircled by the common rotor and has power windings producing a rotating magnetic field while the generator stator has windings for generating the A.C. power to the load during rotation of the so-magnetized rotor. Both stators also have feedback windings. In the motor stator, the feedback windings generate A.C. of a selected magnitude and phase which is conveyed by a resonant circuit to the excitation coil and there combined so as to provide energization thereof by A.C. of such strength and phase condition as to magnetize the layer of permanent magnetic material into the selected pattern. In the generator, the A.C. generated in the feedback windings is conveyed by an electrical circuit to the generator excitation coil, which will essentially neutralize any A.C. induced therein by the magnetic field as the speed changes through the synchronous speed.

U.S. Pat. No. 5,731,649 enclosed herein by reference discloses a device such as an electric motor, an electric generator, or a regenerative electric motor includes a rotor arrangement and a stator arrangement. The stator arrangement has a dielectric electromagnet housing and at least one energizable electromagnet assembly including an overall amorphous metal magnetic core. The overall amorphous metal magnetic core is made up of a plurality of individually formed amorphous metal core pieces. The dielectric electromagnet housing has core piece openings formed into the electromagnet housing for holding the individually formed amorphous metal core pieces in positions adjacent to one another so as to form the overall amorphous metal magnetic core. The device further includes a control arrangement that is able to variably control the activation and deactivation of the electromagnet using any combination of a plurality of activation and deactivation parameters in order to control the speed, efficiency, torque, and power of the device.

WIPO WO/2006/108146 patent application enclosed herein by reference discloses an invention that intends to attain the objective of generating a new drive force additionally and constantly during rotation generated by the driving force from the outside at any rotational frequency inside the mechanism. The present invention comprises a system for synchronously rotating or moving (linear driving) a generator and a motor with a permanent magnet or an electromagnet; the system is supplied with an external drive force to enable a power generator to generate electric powers; the power is supplied to the motor directly or via a phase adjustment device synchronously to cause a phase difference between the rotary magnetic pole generated by the stator in the motor and the magnetic pole on the rotor, and thereby enable the motor rotor to generate a drive force additionally at any rotation frequency of the external drive Hence there is still a long felt need for an efficient electric motor combined with a similarly configured generator, that maximizes mechanical power output for a give physical size.

SUMMARY OF THE INVENTION

Accordingly, it is a principal object of the present invention to disclose an integrated motor generator accommodating movable packed array of matching magnetic pairs having a magnetic field between them and matching stationary packed array disposed between each of said matching magnetic pairs. Tilted magnetic field of each pair and matching tilted electromagnetic coils are used for the motor section of the motor generator. Perpendicular magnetic fields between each matching magnetic pairs and matching electromagnetic coils are used for the generator section of the motor. Thus an integrated motor-generator system is put together effortlessly by combining the two array position variations. The configuration concept accommodates an efficient and high power density motor. Likewise, the configuration concept accommodates an efficient and high power density generator. The integrated motor-generator system enhances efficiency by reducing the electrical energy requirement attributable to feedback electrical voltage.

In accordance with a preferred embodiment of the present invention, it is the object of the invention to disclose:

An electric motor-generator comprising:
(i) a plurality of disk surfaces having a main longitudinal axis, at least one peripheral motor section and at least one central generator section;
each of said peripheral motor section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;

each of said central generator section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;

(ii) a plurality of stationary support structures, each of which is sustaining an array of electromagnetic coils; each coil is disposed in-between each of said matching magnetic pairs;

said coils disposed in-between said matching magnetic pairs in said peripheral motor section are titled at said angle A with respect to said main longitudinal axis;

said coils disposed in-between said matching magnetic pairs in said central generator section are vertically disposed with respect to said main longitudinal axis; and, (iii) a rotating shaft affixed to said disk surfaces.

Each of the plurality of surfaces and plurality of coil arrays comprising a first concentric motor section and a second concentric generator section.

The motor section is accommodating tilted magnetic fields of the matching magnetic pairs and likewise tilted electromagnetic coils.

The generator section is accommodating perpendicular magnetic fields of the matching magnetic pairs and likewise perpendicular coils.

Electrical voltage applied to the tilted coils of the motor section creates within each coil an axial magnetic field. Interaction between the coil magnetic field and the magnetic field of a corresponding matching magnetic pairs creates a force vector directed axially with the tilted magnetic fields. The force vector is having a rotational moment component exerted on the magnetic array surfaces affixed to the rotating shaft.

Electrical power is generated in each of the perpendicular coils of the generator section by a time varying magnetic flux via moving the matching magnetic pairs across the generator coils when the shaft is rotating.

Wherein the motor-generator is adaptable to maximizing efficiency and power density by being configured with the powerful, distinct and uniform plurality of magnetic fields and matching coils and by feeding the electrical voltage output of the generator section into the driving voltage of motor section.

It is one object of the present invention to provide an incorporated electric motor-generator (IEMG), wherein said IEMG comprising:

(i) a plurality of disk surfaces having a main longitudinal axis, at least one peripheral motor section and at least one central generator section;

each of said peripheral motor section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;

each of said central generator section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;

(ii) a plurality of stationary support structures, each of which is sustaining an array of electromagnetic coils; each coil is disposed in-between each of said matching magnetic pairs;

said coils disposed in-between said matching magnetic pairs in said peripheral motor section are titled at said angle A with respect to said main longitudinal axis;

said coils disposed in-between said matching magnetic pairs in said central generator section are vertically disposed with respect to said main longitudinal axis; and, (iii) a rotating shaft affixed to said disk surfaces.

It is another object of the present invention to provide the IEMG as defined above, wherein said angle A is higher than about 0° and lower than about 180°.

It is another object of the present invention to provide the IEMG as defined above, wherein said IEMG increases the power generation efficiency to about 90% according to IEC 60034-30.

It is another object of the present invention to provide the IEMG as defined above, wherein said IEMG increases the power generation efficiency to about 90% according to Edict 553/2005.

It is another object of the present invention to provide the IEMG as defined above, wherein the shape of said magnets are selected from a group consisting of circularly shape or polynomial shape.

It is another object of the present invention to provide the IEMG as defined above, wherein the shape of said magnets are of arbitrary sizes.

It is another object of the present invention to provide the IEMG as defined above, wherein said magnets are at least partially made of iron or any other ferromagnetic compositions.

It is another object of the present invention to provide the IEMG as defined above, wherein the sources of said magnetic fields are facing each other with opposite magnetic poles.

It is another object of the present invention to provide the IEMG as defined above, wherein the sources of said magnetic fields are facing each other with identical magnetic poles.

It is another object of the present invention to provide the IEMG as defined above, wherein said IEMG is constructed so as to minimize air gaps between said magnets and said coils and hence to reduce magnetic field losses.

It is another object of the present invention to provide the IEMG as defined above, wherein said magnetic fields between each of said matching magnetic pairs are distinct and separate attributed to said disk surface having a non magnetic layer.

It is another object of the present invention to provide the IEMG as defined above, wherein said IEMG comprising a plurality of said coil support structures suspending said coil array.

It is another object of the present invention to provide the IEMG as defined above, wherein said coils are wound in a first direction, or reversibly in an opposite direction generating opposite magnetic fields for the same current.

It is another object of the present invention to provide the IEMG as defined above, wherein said IEMG additionally comprising oppositely wound coils arranged, in the same array for optimizing generator efficiency.

It is another object of the present invention to provide the IEMG as defined above, wherein said peripheral motor section is peripheral to said disk and said generator section is central to said disk.

It is another object of the present invention to provide the IEMG as defined above, wherein a division line between said sections varies such that the operation of said IEMG is optimized.

It is another object of the present invention to provide the IEMG as defined above, wherein all of said magnets devices are oriented on a disk with the similar magnetic pole.

It is another object of the present invention to provide the IEMG as defined above, wherein said matching magnetic pairs opposite poles generate a magnetic field of attraction force.

It is another object of the present invention to provide the IEMG as defined above, wherein top surface of top disk and bottom surface of bottom disk contact the iron or any other low magnetic field resistance material walls of the generator package, hence provide a low loss medium path to the magnetic field.

It is another object of the present invention to provide the IEMG as defined above, wherein said magnets are disposed on arbitrarily shaped curved lines from the center of said disk out to the edge of said disk.

It is another object of the present invention to provide the IEMG as defined above, wherein said magnets are disposed on a spiraled line from the center of said disk to the edge of said disk.

It is another object of the present invention to provide the IEMG as defined above, wherein said tilt angles of said peripheral motor section are different for various concentric rings on said disk surface.

It is another object of the present invention to provide a method for incorporating electric motor with an electrical generation. The method comprises steps selected inter alia from (i) providing an incorporated electric motor-generator (IEMG), having:
  a. a plurality of disk surfaces having a main longitudinal axis, at least one peripheral motor section and at least one central generator section;
    each of said peripheral motor section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;
    each of said central generator section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;
  b. a plurality of stationary support structures, each of which is sustaining an array of electromagnetic coils; each coil is disposed in-between each of said matching magnetic pairs;
    said coils disposed in-between said matching magnetic pairs in said peripheral motor section are titled at said angle A with respect to said main longitudinal axis;
    said coils disposed in-between said matching magnetic pairs in said central generator section are vertically disposed with respect to said main longitudinal axis; and,
  c. a rotating shaft affixed to said disk surfaces;
(ii) applying electrical voltage to said tilted electromagnetic coils, thereby generating an axial magnetic field within said coils;
(iii) magnetically interacting said magnetic field generated by said tilted coils and said matching magnetic pairs;
(iv) generating electrical power in each of said vertically coils in said central generator section;
(v) magnetically interacting said magnetic field generated by said vertically coils and said matching magnetic pairs; and,
(vi) rotating said rotating shaft such that said matching magnetic pairs are rotated across said coils; thereby a time-varying magnetic flux is generated whilst increasing efficiency and power density of said IEMG.

It is another object of the present invention to provide the method as defined above, wherein said method increases the power generation efficiency to about 90% according to IEC 60034-30.

It is another object of the present invention to provide the method as defined above, wherein said method increases the power generation efficiency to about 90% according to Edict 553/2005.

It is another object of the present invention to provide the method as defined above, additionally comprising the step of selecting said angle A to be higher than about 0° and lower than about 180°.

It is another object of the present invention to provide the method as defined above, additionally comprising the step of selecting the shape of said magnets from a group consisting of circularly shape or polynomial shape.

It is another object of the present invention to provide the method as defined above, additionally comprising the step of adjusting the sources of said magnetic fields to face each other with opposite magnetic poles.

It is another object of the present invention to provide the method as defined above, additionally comprising the step of adjusting the sources of said magnetic fields to face each other with identical magnetic poles.

It is another object of the present invention to provide the method as defined above, additionally comprising the step of constructing said IEMG so as to minimize air gaps between said magnets and said coils and hence reducing magnetic field losses.

It is another object of the present invention to provide the method as defined above, additionally comprising the step of coating said disk surface with a non magnetic layer thereby distancing and separating said magnetic fields between each of said matching magnetic pairs.

It is another object of the present invention to provide the method as defined above, additionally comprising the step of dividing said sections such that the operation of said IEMG is optimized.

It is another object of the present invention to provide the method as defined above, additionally comprising the step of orienting all of said magnets devices on said disk surface with the similar magnetic pole.

It is another object of the present invention to provide the method as defined above, additionally comprising the step of disposing said magnets on arbitrarily shaped curved lines from the center of said disk out to the edge of said disk.

It is another object of the present invention to provide the method as defined above, additionally comprising the step of disposing said magnets on a spiraled line from the center of said disk to the edge of said disk.

It is another object of the present invention to provide the method as defined above, additionally comprising the step of increasing the power generation efficiency to about 90% according to IEC 60034-30.

It is another object of the present invention to provide the method as defined above, additionally comprising the step of increasing the power generation efficiency to about 90% according to Edict 553/2005.

It is another object of the present invention to provide an incorporated electric motor-generator (IEMG), wherein said IEMG comprising:
 (i) a plurality of disk surfaces having a main longitudinal axis, at least one peripheral generator section and at least one central motor section;
  each of said peripheral generator section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;
  each of said central motor section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;
 (ii) a plurality of stationary support structures, each of which is sustaining an array of electromagnetic coils; each coil is disposed in-between each of said matching magnetic pairs;
  said coils disposed in-between said matching magnetic pairs in said peripheral generator section are titled at said angle A with respect to said main longitudinal axis;
  said coils disposed in-between said matching magnetic pairs in said central motor section are vertically disposed with respect to said main longitudinal axis; and,
 (iii) a rotating shaft affixed to said disk surfaces.

It is another object of the present invention to provide the IEMG as defined above, wherein said angle A is higher than about 0° and lower than about 180°.

It is another object of the present invention to provide the IEMG as defined above, wherein said IEMG increases the power generation efficiency to about 90% according to IEC 60034-30.

It is another object of the present invention to provide the IEMG as defined above, wherein said IEMG increases the power generation efficiency to about 90% according to Edict 553/2005.

It is another object of the present invention to provide the IEMG as defined above, wherein the shape of said magnets are selected from a group consisting of circularly shape or polynomial shape.

It is another object of the present invention to provide the IEMG as defined above, wherein the shape of said magnets are of arbitrary sizes.

It is another object of the present invention to provide the IEMG as defined above, wherein said magnets are at least partially made of iron or any other ferromagnetic compositions.

It is another object of the present invention to provide the IEMG as defined above, wherein the sources of said magnetic fields are facing each other with opposite magnetic poles.

It is another object of the present invention to provide the IEMG as defined above, wherein the sources of said magnetic fields are facing each other with identical magnetic poles.

It is another object of the present invention to provide the IEMG as defined above, wherein said IEMG is constructed so as to minimize air gaps between said magnets and said coils and hence to reduce magnetic field losses.

It is another object of the present invention to provide the IEMG as defined above, wherein said magnetic fields between each of said matching magnetic pairs are distinct and separate attributed to said disk surface having a non magnetic layer.

It is another object of the present invention to provide the IEMG as defined above, wherein said IEMG comprising a plurality of said coil support structures suspending said coil array.

It is another object of the present invention to provide the IEMG as defined above, wherein said coils are wound in a first direction, or reversibly in an opposite direction generating opposite magnetic fields for the same current.

It is another object of the present invention to provide the IEMG as defined above, wherein said IEMG additionally comprising oppositely wound coils arranged, in the same array for optimizing generator efficiency.

It is another object of the present invention to provide the IEMG as defined above, wherein said peripheral generator section is peripheral to the disk and said motor section is central to the disk.

It is another object of the present invention to provide the IEMG as defined above, wherein a division line between said sections varies such that the operation of said IEMG is optimized.

It is another object of the present invention to provide the IEMG as defined above, wherein all of said magnets devices are oriented on a disk with the similar magnetic pole.

It is another object of the present invention to provide the IEMG as defined above, wherein said matching magnetic pairs opposite poles generate a magnetic field of attraction force.

It is another object of the present invention to provide the IEMG as defined above, wherein top surface of top disk and bottom surface of bottom disk contact the iron or any other low magnetic field resistance material walls of the generator package, hence provide a low loss medium path to the magnetic field.

It is another object of the present invention to provide the IEMG as defined above, wherein said magnets are disposed on arbitrarily shaped curved lines from the center of said disk out to the edge of said disk.

It is another object of the present invention to provide the IEMG as defined above, wherein said magnets are disposed on a spiraled line from the center of said disk to the edge of said disk.

It is another object of the present invention to provide the IEMG as defined above, wherein said tilt angles of said peripheral generator section are different for various concentric rings on said disk surface.

It is another object of the present invention to provide a method for incorporating electric motor with an electrical generation. The method comprises steps selected inter alia from:
 (i) providing an incorporated electric motor-generator (IEMG), having:
  a. a plurality of disk surfaces having a main longitudinal axis, at least one peripheral generator section and at least one central motor section;

each of said peripheral generator section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;

each of said central motor section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;

b. a plurality of stationary support structures, each of which is sustaining an array of electromagnetic coils; each coil is disposed in-between each of said matching magnetic pairs;

said coils disposed in-between said matching magnetic pairs in said peripheral generator section are titled at said angle A with respect to said main longitudinal axis;

said coils disposed in-between said matching magnetic pairs in said central motor section are vertically disposed with respect to said main longitudinal axis; and, c. a rotating shaft affixed to said disk surfaces;

(ii) applying electrical voltage to said tilted electromagnetic coils, thereby generating an axial magnetic field within said coils;

(iii) magnetically interacting said magnetic field generated by said tilted coils and said matching magnetic pairs;

(iv) generating electrical power in each of said vertically coils in said peripheral generator section;

(v) magnetically interacting said magnetic field generated by said vertically coils and said matching magnetic pairs; and, (vi) rotating said rotating shaft such that said matching magnetic pairs are rotated across said coils; thereby a time-varying magnetic flux is generated whilst increasing efficiency and power density of said IEMG.

It is another object of the present invention to provide the method as defined above, wherein said method increases the power generation efficiency to about 90% according to IEC 60034-30.

It is another object of the present invention to provide the method as defined above, wherein said method increases the power generation efficiency to about 90% according to Edict 553/2005.

It is another object of the present invention to provide the method as defined above, additionally comprising the step of selecting said angle A to be higher than about 0° and lower than about 180°.

It is another object of the present invention to provide the method as defined above, additionally comprising the step of selecting the shape of said magnets from a group consisting of circularly shape or polynomial shape.

It is another object of the present invention to provide the method as defined above, additionally comprising the step of adjusting the sources of said magnetic fields to face each other with opposite magnetic poles.

It is another object of the present invention to provide the method as defined above, additionally comprising the step of adjusting the sources of said magnetic fields to face each other with identical magnetic poles.

It is another object of the present invention to provide the method as defined above, additionally comprising the step of constructing said IEMG so as to minimize air gaps between said magnets and said coils and hence reducing magnetic field losses.

It is another object of the present invention to provide the method as defined above, additionally comprising the step of coating said disk surface with a non magnetic layer thereby distancing and separating said magnetic fields between each of said matching magnetic pairs.

It is another object of the present invention to provide the method as defined above, additionally comprising the step of dividing said sections such that the operation of said IEMG is optimized.

It is another object of the present invention to provide the method as defined above, additionally comprising the step of orienting all of said magnets devices on said disk surface with the similar magnetic pole.

It is still an object of the present invention to provide the method as defined above, additionally comprising the step of disposing said magnets on arbitrarily shaped curved lines from the center of said disk out to the edge of said disk.

It is lastly an object of the present invention to provide the method as defined above, additionally comprising the step of disposing said magnets on a spiraled line from the center of said disk to the edge of said disk.

BRIEF DESCRIPTION OF FIGURES

For a better understanding of the invention with regard to embodiments thereof, reference is made to the accompanying drawings, in which the numerals designate corresponding elements in sections throughout and in which.

DESCRIPTION OF THE PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an electric motor-generator.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

The drawings set forth the preferred embodiments of the present invention. The embodiments of the invention disclosed herein are the best modes contemplated by the inventors for carrying out their invention in a commercial environment, although it should be understood that various modifications are accomplished within the parameters of the present invention.

The term 'electric motor' or 'motor' refers hereinafter in a non-limiting manner to a machine that converts electrical voltage into rotary mechanical force.

The term 'rotor' refers hereinafter in a non-limiting manner to the rotary portion of the motor rotating around the motor shaft.

The term 'stator' refers hereinafter in a non-limiting manner to the fixed portion of the motor applying magnetic field force on the rotor.

The term 'electromagnetic coil' or 'coil' refers hereinafter in a non-limiting manner to an element, which is made of a plurality of conductor wire windings around a ferromagnetic core.

The term 'coil support structure' or 'support structure' refers hereinafter in a non-limiting manner to a motor stator structure usable for sustaining the array of coils.

The term 'ferromagnetic core' refers hereinafter in a non-limiting manner to a material structure of substances such as iron, nickel, or cobalt and various alloys that exhibit extremely high magnetic permeability, a characteristic saturation point, and magnetic hysteresis.

The term 'permanent magnetic field source' refers hereinafter in a non-limiting manner to a device made of special material that produces a magnetic field for a long time all by itself.

The term 'magnetic device' or 'magnet' refers hereinafter in a non-limiting manner to a permanent magnetic field source or a matching iron part. A magnetic field is created between any pair of magnets facing each other.

The term 'non magnetic material' refers hereinafter in a non-limiting manner to materials having the magnetic fields of the individual atoms randomly aligned and thus tend to cancel out.

The term "about" refers hereinafter to a range of 25% below or above the referred value.

The term "International Electrotechnical Commission (IEC) 60034-30" refers hereinafter to a new standard developed by the IEC. 'IEC 60034-30, Efficiency Classes of single-speed three-phase cage induction motors'. The aim of this standard is to provide a globally harmonized set of performance labels categorizing energy efficiency classes of single-speed three-phase cage induction motors. The scope of motors considered will be 3 phase cage induction motors at 50 Hz or 60 Hz that:

have a rated power between 0.75 kW and 200 kW
have a rated voltage of up to 1000V
be rated for continuous duty—S1
be protection rated IP4x or higher The term "Edict 553/2005" refers hereinafter to an updated regulation, from the end of 2005. The first regulation of the "Energy Efficient Act" for electric motors, launched in 2002, established two sets of minimum efficiency performance standards (MEPS), for 'standard' (mandatory) and 'high efficiency' (voluntary) motors (see Agenor Gomes Pinto Garciaa, Alexandre S. Szkloa, Roberto Schaeffera and Michael A. McNeilb, "Energy-efficiency standards for electric motors in Brazilian industry", Energy Policy, Volume 35, Issue 6, June 2007, Pages 3424-3439).

The present invention utilizes movable packed arrays of matching magnetic pairs having magnetic fields between them and matching stationary packed arrays disposed between the matching magnetic pairs. Tilted magnetic field of each pair and matching tilted electromagnetic coils are used for the motor section of the motor generator. Perpendicular magnetic fields between each matching magnetic pairs and matching perpendicular electromagnetic coils are used for the generator section of the motor. Thus an integrated motor-generator device can be put together effortlessly. The configuration concept accommodates an efficient and high power density motor. Likewise, the configuration concept accommodates an efficient and high power density generator. The integrated motor-generator device enhances efficiency substantially further.

Figure 1:
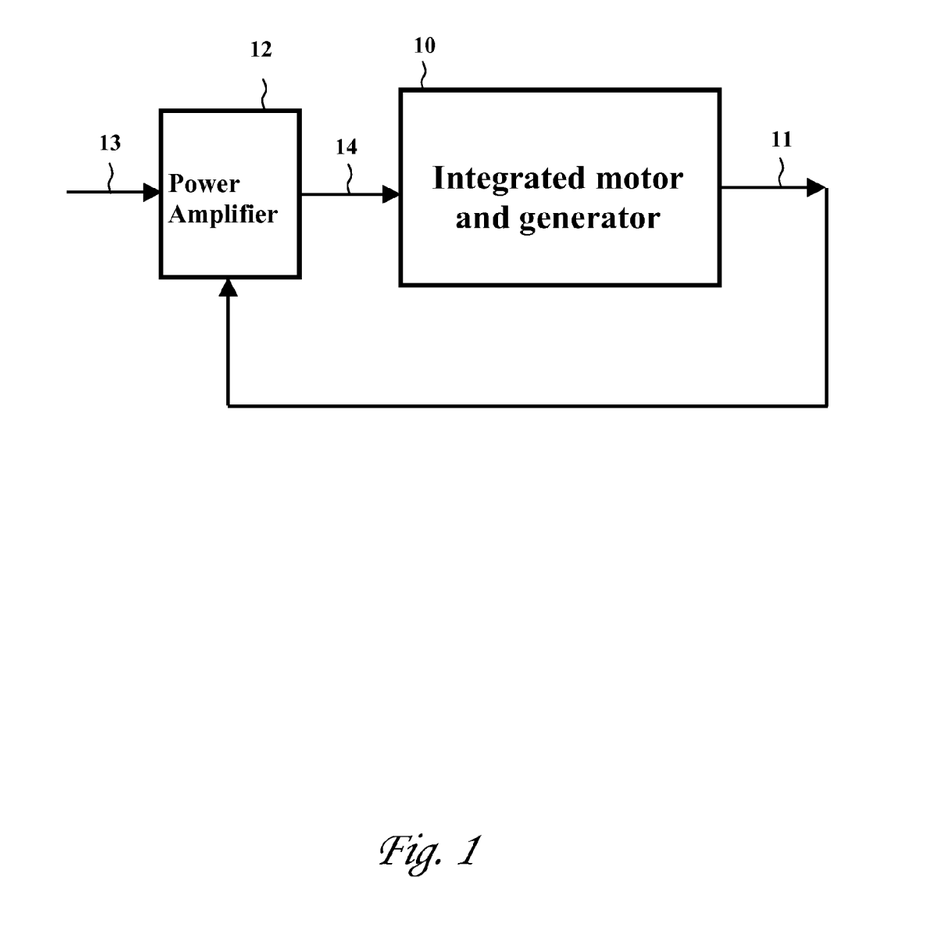
FIG. 1 illustrates a schematic block diagram of a system including an integrated motor generator driven by a power amplifier according to an embodiment of the present invention.

Reference is now made to FIG. 1, a block diagram of an integrated motor-generator system. Integrated motor-generator 10 has a unique configuration adapted in a first section for operating as a motor and adapted in a second section for operating as a generator by accommodating insignificant changes to the basic configuration. The motor input voltage 14 is connected to electromagnetic coils in the motor section for rotating the motor rotor. Similar electromagnetic coils, which are differently oriented, in the generator section, generate electrical voltage output 11. The output voltage 11 is fed back into the power amplifier 12 which is also connected to input voltage 13. Power amplifier 12 matches the phase of input voltage 13 and generator output voltage 11 accommodating lesser electrical power use by subtracting fed back voltage 11 from input voltage 13 and consequently increasing motor efficiency.

Figure 2:
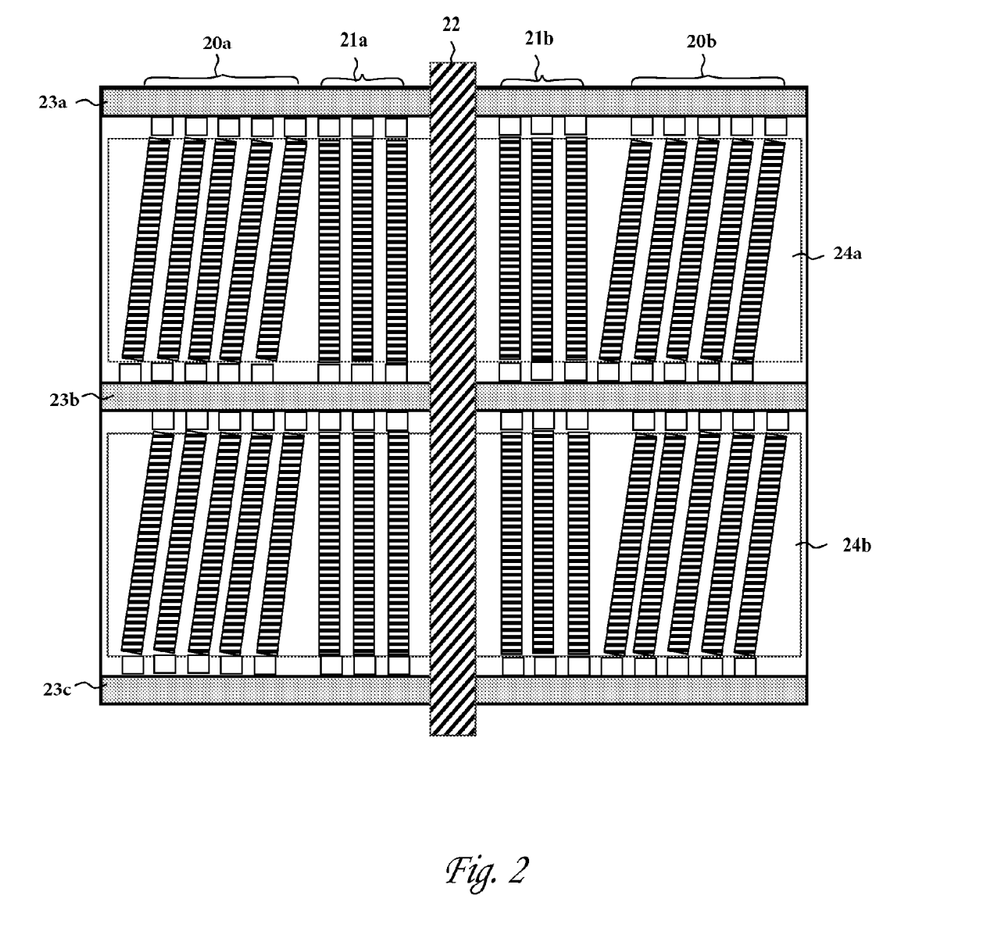
FIG. 2 illustrates a non-dimensionally scaled cross sectional view of a cylindrically shaped integrated motor generator according to an embodiment of the present invention.

Reference is now made to FIG. 2 a non-dimensionally scaled cross sectional view of a motor-generator embodiment. A cylindrically shaped motor-generator rotates around shaft 22 disposed at the cylindrical symmetry axis. Disks 23*a*, 23*b* and 23*c* affixed to motor shaft 22 are the infrastructure of the motor-generator rotor. An array of magnets is affixed to the bottom surface of disk 23*a*. Likewise, an array of magnets is affixed to the top surface of disk 23*b*. The magnets arrays of these adjacent surfaces are arranged in matching pairs (matching magnetic pairs) facing each other. Likewise, magnets array pairs facing each other are affixed to the bottom surface of disk 23*b* and to the top surface of disk 23*c*. Coil support structures 24*a* and 24*b* are the infrastructure of the motor-generator stator. Coil support structure 24*a* sustains a plurality of electromagnetic coils between each matching magnetic pairs affixed to disks 23*a* and 23*b*. Likewise, coil support structure 24*b* sustains a plurality of coils between each matching magnetic pairs affixed to disks 23*b* and 23*c*. Magnetic fields of matching magnetic pairs and corresponding coils disposed in peripheral section 20*a* and 20*b* are equally tilted. A voltage applied to the coils in this section generates a magnetic field tilted axially. The interaction between the magnetic fields of the coils and magnetic fields of the matching magnetic pairs creates a force vector in the same direction having components exerting a rotational moment on the rotor. Thus this section is the motor section of the device. Magnetic fields of matching magnetic pairs and corresponding coils disposed in the central section 21*a* and 21*b* are vertically disposed. When the rotor is rotating, the perpendicular magnetic fields between the matching magnetic pairs introduce a time varying magnetic flux through the perpendicular coils generating a voltage in the coils. The perpendicular coils are connected to the voltage output of the generator section. Thus the motor configuration is turned into a generator by using perpendicular arrangement rather than tilted arrangement.

In the above embodiment the motor includes three disks with four magnetic array surfaces, in a non-limiting manner. Nonetheless, any practical number of disks used is within the scope of the invention.

The tilt angle, which can have any value between greater than 0° up to 180° in any direction with respect to the main longitudinal axis of the disk, may differ on various locations within the motor-generator volume, for optimizing motor operation and efficiency.

The magnets may have a polygon or circular shape and is either a magnetic field source, commonly fabricated from a rare earth material as samarium, neodymium or a part made of iron. The structure is packaged within an ironed wall package with low magnetic losses, which are used to close the magnetic field lines while minimizing losses.

The disks are made of magnetic materials contacting the iron made motor shaft and iron made motor enclosure for providing low magnetic resistance path to the magnetic field of each pair. Air gaps between coils and corresponding matching magnetic pairs of the arrangement are minimized for minimizing magnetic field losses through them.

High magnetic flux density created by a plurality of matching magnetic pairs, a dense structure of matching magnetic pairs and matching generator coils, minimal size of air gaps between the coils and the magnets minimizing magnetic field losses, are adaptable in this invention for providing high efficiency and high-density electrical motor-generator.

Winding of electromagnetic coils can be made in two opposite directions creating opposite magnetic field directions and consequently opposite force vectors. In one embodiment the array of coils may include reversibly wound coils arranged in the array and used for optimizing motor-generator efficiency.

Figure 3:
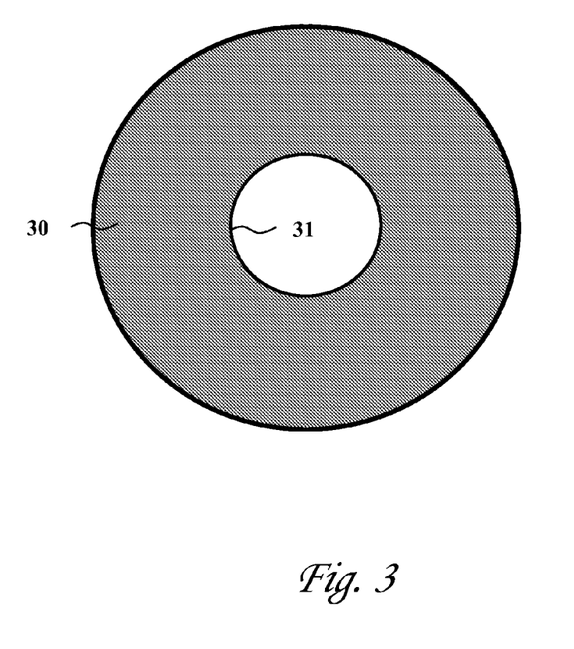
FIG. 3 illustrates a non-dimensionally scaled top view of a circular disk surface, used for affixing an array of magnets, having a peripheral motor section and a central generator section according to an embodiment of the present invention.

Reference is now made to FIG. 3, a top view of a motor generator disk depicting the motor and generator sections. Peripheral motor section 30 extending from the disk edge inwardly. The generator is included the smaller central section 31 of the disk. The rotational moment applied on the rotor is highest at the disk edge. For that reason the external section of the rotary disks is used for the motor and the central internal section of the disk is used for configuring the generator.

Figure 4:
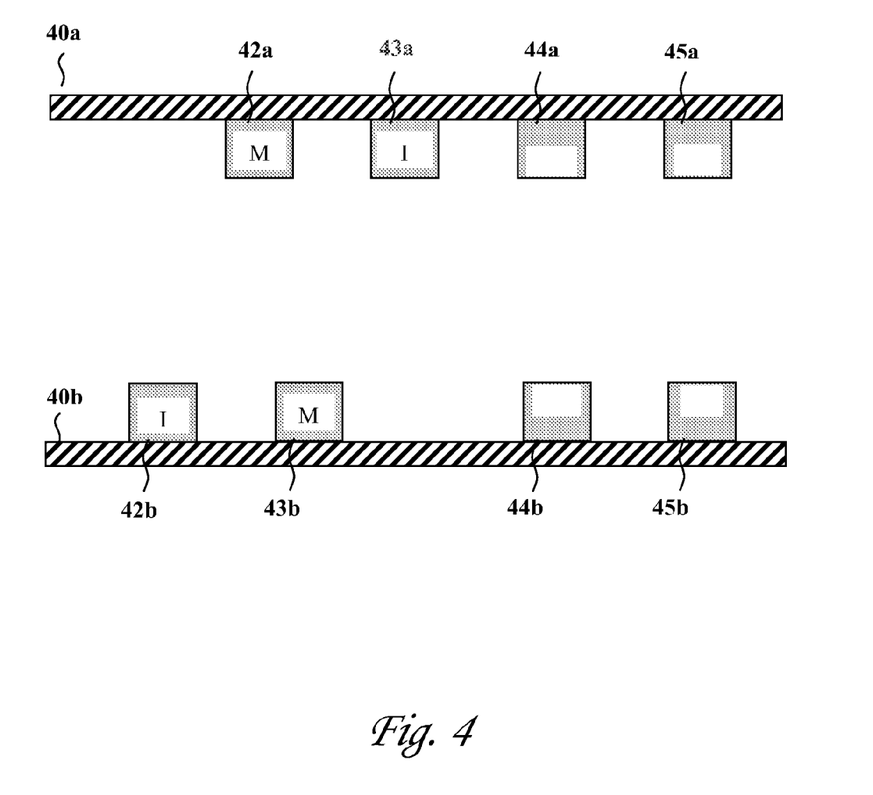
FIG. 4 illustrates a non-dimensionally scaled cross sectional view of two adjacent sections of circularly shaped disks affixed with magnets having a motor arrangement and a generator arrangement according to an embodiment of the present invention.

Reference is now made to FIG. 4, a cross sectional view of a fraction of two adjacent disks having pairs of magnets facing each other affixed to them. The matching magnetic pairs are displaced in the motor section to form a tilted magnetic field and are non-displaced in the generator section to form perpendicular magnetic fields between them.

At the generator section, magnet 45*a* affixed to disk 40*a* and magnet 45*b* affixed to disk 40*b*, are a pair of permanent field sources. Permanent magnetic source 45*b* has a north magnetic pole facing upward and permanent magnetic source 45*a* has a south magnetic pole facing downward. Consequently, the magnetic field between this pair creates a perpendicular attraction force.

At the generator section too, magnet 44*a* and magnet 44*b* are permanent magnets with their common north poles. Consequently, the magnetic field between this pair creates a perpendicular repelling force.

At the motor section magnet 43*a* is an iron part and magnet 43*b* is a permanent magnetic field source of any pole direction. A tilted magnetic field is generated between this pair of magnets by the iron part 43*a* being magnetized by the permanent magnetic field source 43*b*.

At the motor section magnet 42*a* is a permanent magnetic field source and magnet 42*b* is a part of iron. Thus this pair of magnets is arranged opposite to the pair of magnets 43*a* and 43*b* and has a tilted magnetic field as well.

At the motor section, the magnetic field of an electromagnetic coil disposed between the matching magnetic pairs and applied with an electrical voltage, interact with the tilted magnetic field of the pair. The offset between pairs of magnets does not coincide with a disk radial line. Consequently, the interaction between the magnetic field of the matching magnetic pairs and the magnetic field of the related coil creates a force vector having a tangential component on the disk exerting a rotational moment on the motor rotor.

At the generator section, when the rotor is rotating time varying perpendicular magnetic flux is applied to the perpendicular coils and generates an electrical voltage in each of the generator coils.

Figure 5A:
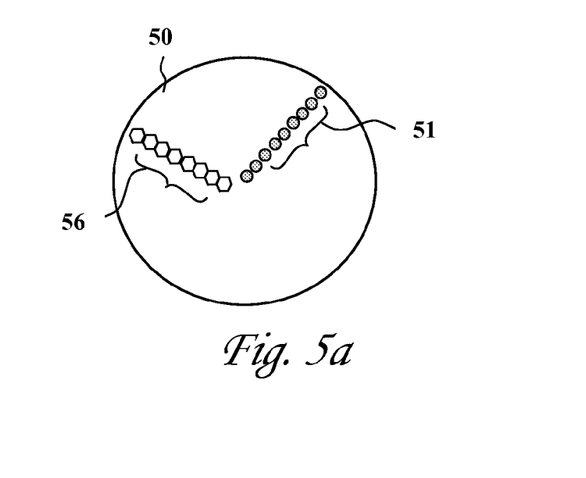
FIG. 5a illustrates a non-dimensionally scaled top view of a disk surface affixed with circularly shaped magnets arranged along a first radial line and hex shaped magnets arranged on a second radial line according to an embodiment of the present invention.

Reference is now made to FIG. 5*a*, which is a top view of a disk of the motor showing an embodiment of magnets' arrangement on motor-generator disk 50. A array of magnets can be arranged staggered along adjacent radial lines on the disk. For example, the line of roundly shaped magnets 51 are arranged along a radial line and an adjacent line of magnets are staggered with respect to radial line 51. Likewise, a line of hex shaped magnets 56 can be arranged along a radial line. Adjacent hex shaped radial lines do not have to be staggered by fitting well side by side on adjacent radial lines.

The disk is made of magnetic material for providing low magnetic field resistance. The disk surface is coated with a non-magnetic material for accommodating magnetic field isolation between the magnets. The magnetic disk contacts the iron made shaft and motor enclosure for providing low magnetic field resistance to the matching magnetic pairs.

Figure 5B:
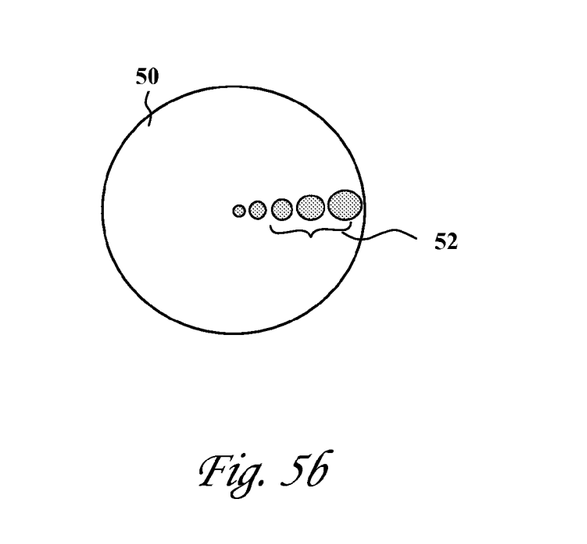
FIG. 5b illustrates a non-dimensionally scaled top view of a disk surface affixed with circularly shaped magnets arranged along a radial line thus increasing in size from the disk center to the disk edge according to an embodiment of the present invention.

Reference is now made to FIG. 5*b*, which is a top view of a disk showing a magnets arrangement on motor-generator disk 50. An array of magnets can be arranged along radial lines on the disk. For example, the line of roundly shaped magnets 52 are arranged along a radial line. The magnets arranged along a radial line have a gradual size increase. This allows an easier arrangement of magnets along adjacent radial lines.

The disk is made of magnetic material for providing low magnetic field resistance to the magnetic field of the matching magnetic pairs. The disk surface is coated with a non-magnetic material for accommodating magnetic isolation between the magnets. The magnetic disk contacts the iron made motor enclosure for providing low magnetic field resistance to the matching magnetic pairs.

Figure 5C:
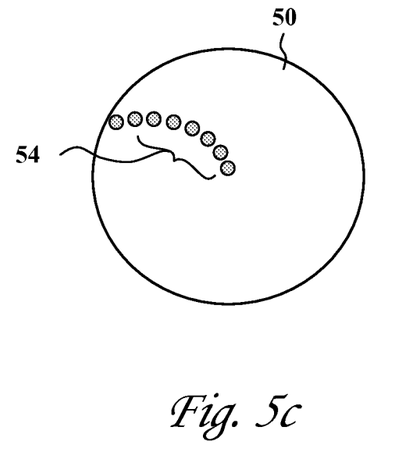
FIG. 5c illustrates a non-dimensionally scaled top view of a disk surface affixed with circularly shaped magnets arranged along a curved radial line according to an embodiment of the present invention and FIG. 5d illustrates a non-dimensionally scaled top view of a disk surface affixed with circularly shaped magnets arranged along a spiral line from the center of the disk to the disk edge according to an embodiment of the present invention.

Reference is now made to FIG. 5c, showing another magnets arrangement on motor-generator disk 50. An array of magnets is arranged along a curved line from the disk center to the disk edge, rather than along a straight radial line, as in the preceding figures.

The disk is made of magnetic material for providing low magnetic field resistance to the magnetic field of the magnets. The disk surface is coated with a non-magnetic material for accommodating magnetic isolation between the magnets. The magnetic disk contacts the iron made motor enclosure for providing low magnetic field resistance to the matching magnetic pairs.

Figure 5D:
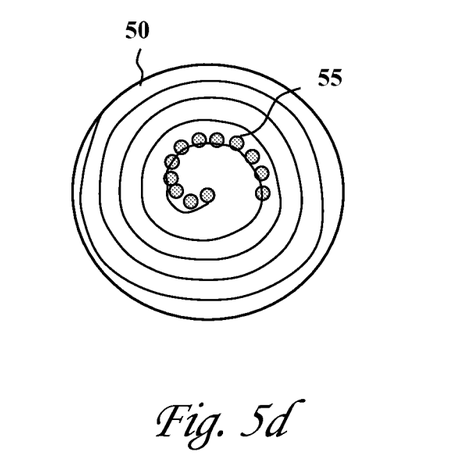

Reference is now made to FIG. 5d, which is a top view of a disk embodiment showing another magnets arrangement on motor disk 50. An array of magnets is arranged along a spiral 55 starting at the disk center and extending all the way to the disk edge.

The disk is made of magnetic material for providing low magnetic field resistance to the magnetic field of the magnets. The disk surface is coated with a non-magnetic material for accommodating magnetic isolation between the magnets. The magnetic disk contacts the iron made motor enclosure for providing low magnetic field resistance to the matching magnetic pairs.

The magnets arrangement embodiment within the scope of the invention may include a plurality device sizes and shapes, which can be arranged differently as arrays of magnets.

The tilt angle of the magnetic field of magnet pairs can be of different angle and direction with respect to the main longitudinal axis of the disk.

It will be appreciated that the formerly described methods may be varied in many ways including, changing the order of steps, and/or performing a plurality of steps concurrently.

It should also be appreciated that the above described description of methods and apparatus are to be interpreted as including apparatus for carrying out the methods, and methods of using the apparatus.

For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and steps described with respect to one embodiment may be used with other embodiments and that not all embodiments of the invention have all of the features and/or steps shown in a particular figure or described with respect to one of the embodiments. That is, the disclosure should be considered complete from combinatorial point of view, with each embodiment of each element considered disclosed in conjunction with each other embodiment of each element (and indeed in various combinations of compatible implementations of variations in the same element). Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims.

It is noted that some of the above described embodiments may describe the best mode contemplated by the inventors and therefore may include structure, acts or details of structures and acts that may not be essential to the invention and which are described as examples. Structure and acts described herein are replaceable by equivalents performing the same function, even if the structure or acts are different, as known in the art. Therefore, the scope of the invention is limited only by the elements and limitations as used in the claims.

The invention claimed is:

1. An incorporated electric motor-generator (IEMG), wherein said IEMG comprising:
   (i) a plurality of disk surfaces having a main longitudinal axis, at least one peripheral motor section and at least one central generator section;
      each of said peripheral motor section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;
      each of said central generator section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;
   (ii) a plurality of stationary support structures, each of which is sustaining an array of electromagnetic coils; each coil is disposed in-between each of said matching magnetic pairs; said coils disposed in-between said matching magnetic pairs in said peripheral motor section are titled at said angle A with respect to said main longitudinal axis; said coils disposed in-between said matching magnetic pairs in said central generator section are vertically disposed with respect to said main longitudinal axis; and
   (iii) a rotating shaft affixed to said disk surfaces.

2. The IEMG according to claim 1, wherein at least one of the following is being held true (a) said IEMG increases the power generation efficiency to about 90% according to IEC 60034-30; (b) said IEMG increases the power generation efficiency to about 90% according to Edict 553/2005; (c) the shape of said magnets are selected from a group consisting of circularly shape or polynomial shape; (d) the shape of said magnets are of arbitrary sizes; (e) said magnets are at least partially made of iron or any other ferromagnetic compositions; (f) the sources of said magnetic fields are facing each other with opposite magnetic poles; (g) the sources of said magnetic fields are facing each other with identical magnetic poles; (h) said IEMG is constructed so as to minimize air gaps between said magnets and said coils and hence to reduce magnetic field losses; (i) said magnetic fields between each of said matching magnetic pairs are distinct and separate attributed to said disk surface having a non magnetic layer; and any combination thereof.

3. The IEMG according to claim 1, wherein at least one of the following is being held true (a) said IEMG comprising a plurality of said coil support structures suspending said coil array;
(b) said coils are wound in a first direction, or reversibly in an opposite direction generating opposite magnetic fields for the same current; (c) said IEMG additionally comprising oppositely wound coils arranged, in the same array for optimizing generator efficiency; (d) said peripheral motor section is peripheral to said disk and said generator section is central to said disk; (e) a division line between said sections varies such that the operation of said IEMG is optimized; and any combination thereof.

4. The IEMG according to claim 1, wherein at least one of the following is being held true (a) all of said magnets devices are oriented on a disk with the similar magnetic pole; (b) said matching magnetic pairs opposite poles generate a magnetic field of attraction force; (c) said magnets are disposed on arbitrarily shaped curved lines from the center of said disk out to the edge of said disk; (d) top surface of top disk and bottom surface of bottom disk contact the iron or any other low magnetic field resistance material walls of the generator package, hence provide a low loss medium path to the magnetic field; (e) said magnets are disposed on a spiraled line from the center of said disk to the edge of said disk; (f) said tilt angles of said peripheral motor section are different for various concentric rings on said disk surface; and any combination thereof.

5. The IEMG according to claim 1, wherein said tilt angles of said peripheral generator section are different for various concentric rings on said disk surface.

6. The IEMG according to claim 1, wherein said angle A is higher than about 0° and lower than about 180°.

7. A method for incorporating electric motor with an electrical generation, wherein said method comprising steps of:
(i) providing an incorporated electric motor-generator (IEMG), having:
   a. a plurality of disk surfaces having a main longitudinal axis, at least one peripheral motor section and at least one central generator section;
   each of said peripheral motor section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;
   each of said central generator section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;
   b. a plurality of stationary support structures, each of which is sustaining an array of electromagnetic coils; each coil is disposed in-between each of said matching magnetic pairs; said coils disposed in-between said matching magnetic pairs in said peripheral motor section are titled at said angle A with respect to said main longitudinal axis; said coils disposed in-between said matching magnetic pairs in said central generator section are vertically disposed with respect to said main longitudinal axis; and,
   c. a rotating shaft affixed to said disk surfaces;
(ii) applying electrical voltage to said tilted electromagnetic coils, thereby generating an axial magnetic field within said coils;
(iii) magnetically interacting said magnetic field generated by said tilted coils and said matching magnetic pairs;
(iv) generating electrical power in each of said vertically coils in said central generator section;
(v) magnetically interacting said magnetic field generated by said vertically coils and said matching magnetic pairs; and
(vi) rotating said rotating shaft such that said matching magnetic pairs are rotated across said coils; thereby a time-varying magnetic flux is generated whilst increasing efficiency and power density of said IEMG.

8. The method according to claim 7, wherein at least one of the following is behind held true (a) said method increases the power generation efficiency to about 90% according to IEC 60034-30; (b) said method increases the power generation efficiency to about 90% according to Edict 553/2005; (c) said method additionally comprising the step of selecting said angle A to be higher than about 0° and lower than about 180°; (d) said method additionally comprising the step of selecting the shape of said magnets from a group consisting of circularly shape or polynomial shape; (e) said method additionally comprising the step of adjusting the sources of said magnetic fields to face each other with opposite magnetic poles; (f) said method additionally comprising the step of adjusting the sources of said magnetic fields to face each other with identical magnetic poles; (g) said method additionally comprising the step of constructing said IEMG so as to minimize air gaps between said magnets and said coils and hence reducing magnetic field losses; (h) said method additionally comprising the step of coating said disk surface with a non magnetic layer thereby distancing and separating said magnetic fields between each of said matching magnetic pairs.

9. The method according to claim 8, additionally comprising at least one step selected from a group consisting of (a) dividing said sections such that the operation of said IEMG is optimized; (b) orienting all of said magnets devices on said disk surface with the similar magnetic pole; (c) disposing said magnets on arbitrarily shaped curved lines from the center of said disk out to the edge of said disk; (d) disposing said magnets on a spiraled line from the center of said disk to the edge of said disk; (e) increasing the power generation efficiency to about 90% according to IEC 60034-30; (f) increasing the power generation efficiency to about 90% according to Edict 553/2005; and any combination thereof.

10. An incorporated electric motor-generator (IEMG), wherein said IEMG comprising:
(i) a plurality of disk surfaces having a main longitudinal axis, at least one peripheral generator section and at least one central motor section;
   each of said peripheral generator section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;
   each of said central motor section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;

(ii) a plurality of stationary support structures, each of which is sustaining an array of electromagnetic coils; each coil is disposed in-between each of said matching magnetic pairs; said coils disposed in-between said matching magnetic pairs in said peripheral generator section are titled at said angle A with respect to said main longitudinal axis; said coils disposed in-between said matching magnetic pairs in said central motor section are vertically disposed with respect to said main longitudinal axis; and, (iii) a rotating shaft affixed to said disk surfaces.

11. The IEMG according to claim 10, wherein said angle A is higher than about 0° and lower than about 180°.

12. The IEMG according to claim 11, wherein at least one of the following is being held true (a) said IEMG increases the power generation efficiency to about 90% according to IEC 60034-30; (b) said IEMG increases the power generation efficiency to about 90% according to Edict 553/2005; (c) the shape of said magnets are selected from a group consisting of circularly shape or polynomial shape; (d) the shape of said magnets are of arbitrary sizes; (e) said magnets are at least partially made of iron or any other ferromagnetic compositions; (f) the sources of said magnetic fields are facing each other with opposite magnetic poles; (g) the sources of said magnetic fields are facing each other with identical magnetic poles; (h) said IEMG is constructed so as to minimize air gaps between said magnets and said coils and hence to reduce magnetic field losses; (i) said magnetic fields between each of said matching magnetic pairs are distinct and separate attributed to said disk surface having a non magnetic layer.

13. The IEMG according to claim 11, wherein at least one of the following is being held true (a) said IEMG comprising a plurality of said coil support structures suspending said coil array; (b) said coils are wound in a first direction, or reversibly in an opposite direction generating opposite magnetic fields for the same current; (c) said IEMG additionally comprising oppositely wound coils arranged, in the same array for optimizing generator efficiency; (d) said peripheral generator section is peripheral to the disk and said motor section is central to the disk; (e) all of said magnets devices are oriented on a disk with the similar magnetic pole; (f) said matching magnetic pairs opposite poles generate a magnetic field of attraction force; and any combination thereof.

14. The IEMG according to claim 11, wherein a division line between said sections varies such that the operation of said IEMG is optimized.

15. The IEMG according to claim 11, wherein top surface of top disk and bottom surface of bottom disk contact the iron or any other low magnetic field resistance material walls of the generator package, hence provide a low loss medium path to the magnetic field.

16. The IEMG according to claim 11, wherein said magnets are disposed on arbitrarily shaped curved lines from the center of said disk out to the edge of said disk.

17. The IEMG according to claim 11, wherein said magnets are disposed on a spiraled line from the center of said disk to the edge of said disk.

18. A method for incorporating electric motor with an electrical generation, said method comprising steps of:

(i) providing an incorporated electric motor-generator (IEMG), having:

a. a plurality of disk surfaces having a main longitudinal axis, at least one peripheral generator section and at least one central motor section;

each of said peripheral generator section of said disk surfaces is coupled to an array of offset magnets; said magnets are arranged as matching magnetic pairs on two adjacent disk surfaces so as to create a plurality of tilted magnetic fields between said matching magnetic pairs; said tilted magnetic fields are tilted at an angle A with respect to said main longitudinal axis;

each of said central motor section of said disk surfaces is coupled to an array of magnets; said magnets are arranged as matching magnetic pairs on two adjacent disk surfaces so as to create a plurality of vertical magnetic fields between said matching magnetic pairs; said vertical magnetic fields are vertically disposed with respect to said main longitudinal axis;

b. a plurality of stationary support structures, each of which is sustaining an array of electromagnetic coils; each coil is disposed in-between each of said matching magnetic pairs;

said coils disposed in-between said matching magnetic pairs in said peripheral generator section are titled at said angle A with respect to said main longitudinal axis;

said coils disposed in-between said matching magnetic pairs in said central motor section are vertically disposed with respect to said main longitudinal axis; and, c. a rotating shaft affixed to said disk surfaces;

(ii) applying electrical voltage to said tilted electromagnetic coils, thereby generating an axial magnetic field within said coils;

(iii) magnetically interacting said magnetic field generated by said tilted coils and said matching magnetic pairs;

(iv) generating electrical power in each of said vertically coils in said peripheral generator section;

(v) magnetically interacting said magnetic field generated by said vertically coils and said matching magnetic pairs; and (vi) rotating said rotating shaft such that said matching magnetic pairs are rotated across said coils; thereby a time-varying magnetic flux is generated whilst increasing efficiency and power density of said IEMG.

19. The method according to claim 18, wherein at least one of the following is being held true (a) said method increases the power generation efficiency to about 90% according to IEC 60034-30; (b) said method increases the power generation efficiency to about 90% according to Edict 553/2005; (c) said method additionally comprising the step of selecting said angle A to be higher than about 0° and lower than about 180°; (d) said method additionally comprising the step of selecting the shape of said magnets from a group consisting of circularly shape or polynomial shape; (e) said method additionally comprising the step of adjusting the sources of said magnetic fields to face each other with opposite magnetic poles; (f) said method additionally comprising the step of adjusting the sources of said magnetic fields to face each other with identical magnetic poles.

20. The method according to claim 19, wherein said method additionally comprising at least one step selected from a group consisting of (a) constructing said IEMG so as to minimize air gaps between said magnets and said coils and hence reducing magnetic field losses; (b) coating said disk surface with a non magnetic layer thereby distancing and separating said magnetic fields between each of said matching magnetic pairs; (c) dividing said sections such that the operation of said IEMG is optimized; (d) orienting all of said magnets devices on said disk surface with the similar magnetic pole; (e) disposing said magnets on arbitrarily shaped curved lines from the center of said disk out to the edge of said disk; (f) disposing said magnets on a spiraled line from the center of said disk to the edge of said disk; and any combination thereof.

* * * * *